G. B. St. JOHN.
Wheel Cultivator.
No. 101,536.
Patented April 5, 1870.
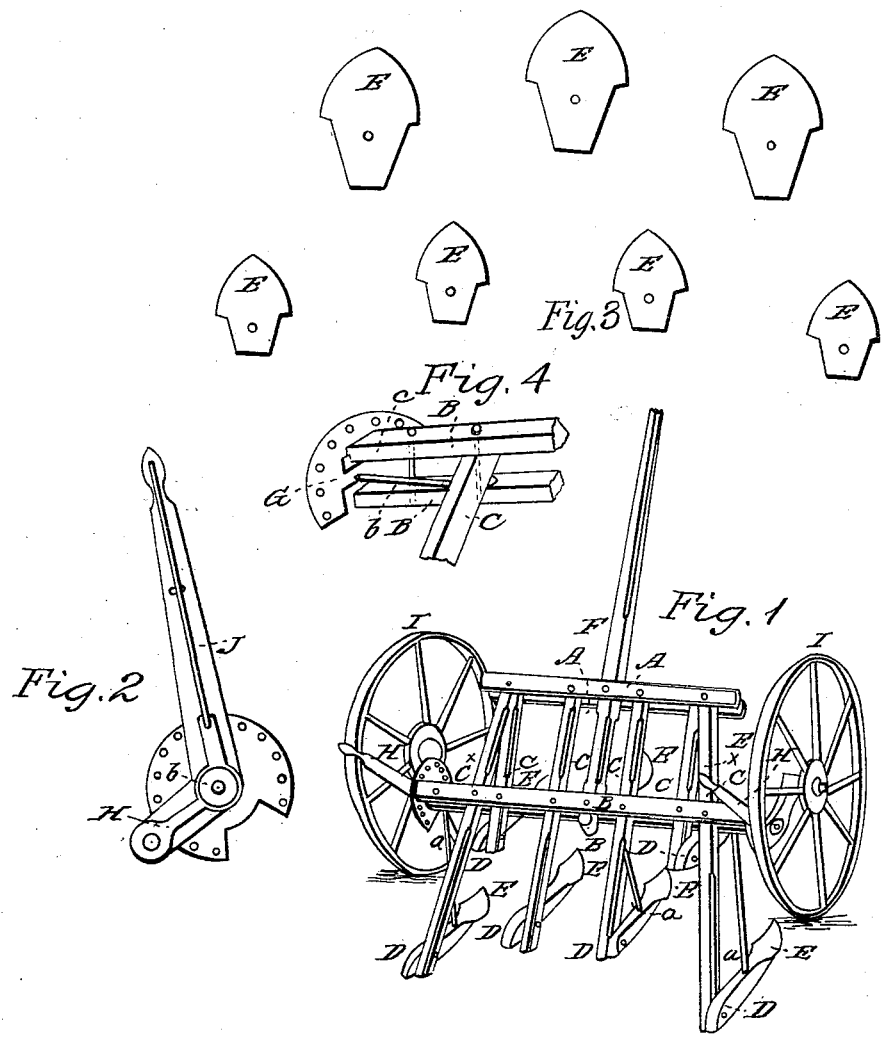
Witnesses:
Mortimer Cahill
James B. St John
Inventor:
Garland B. St John

UNITED STATES PATENT OFFICE.

GARLAND B. ST. JOHN, OF KALAMAZOO, MICHIGAN.

IMPROVEMENT IN CULTIVATORS.

Specification forming part of Letters Patent No. 101,536, dated April 5, 1870; antedated April 1, 1870.

*To all whom it may concern:*

Be it known that I, GARLAND B. ST. JOHN, of the village of Kalamazoo, in the county of Kalamazoo and State of Michigan, have invented a new and Improved Fallow-Cultivator; and I do hereby declare that the following is a full, clear, and exact description thereof, which will enable those skilled in the art to make and use the same, reference being had to the accompanying sheet of drawings, forming a part of this specification.

This invention relates to a new and improved way of constructing the frame so as to obviate the use of mortise and tenon, and at the same time give the required brace to the machine; also, an improved manner of constructing the plows or shovels and arranging them so as to leave the earth uniform behind the machine; also, an improved device for attaching the axle-trees to the frame.

The object of this invention is to obtain a fallow-cultivator possessing all of the above advantages, together with great durability and cheapness of construction.

In the accompanying sheet of drawings, Figure 1 is a perspective view of my invention; Figs. 2 and 4, sectional views, showing the construction and arrangement of the axle-trees. Fig. 3 shows the manner of graduating the size of the plows and shovels.

Similar letters indicate corresponding parts.

In Fig. 1, beams A A, forming the front of the frame, and beams B B, forming the center, are bolted to the top and bottom of longitudinal beams C C and oblique beams $C^\times C^\times$, which are bolted together at their front ends, the whole combination being to brace the frame sufficiently and to do away with mortise and tenon.

To the ends of the beams C C and $C^\times C^\times$ are bolted standards D' D', which are provided with braces $a\ a$, and have plows or shovels E E secured to their lower ends, which plows are graduated as to width, and arranged the wide ones in front and narrow ones in the rear, for the purpose of leaving the ground level and uniform, the rear ones being just wide enough to carry the earth into the side of the furrow made by the front ones, but not wide enough to raise a ridge over the furrow of the front ones, as in the case when all are of uniform width. The ends of central cross-beams, B B, are sawed to the proper angle, when plates G G, holding levers and axles H H, Fig. 4, are bolted to their ends by means of horizontal bolts $b\ b$, which hold the plate firmly against the end of the grain of the wood, and vertical bolts $c\ c$, holding the ends of beams B B firmly into the sockets of the plates G G, which are severally arranged for the purpose of securing a rigid bearing for the axle-plate, preventing it from becoming easily displaced.

Upon axles H H are attached wheels I I, which may be raised or lowered at pleasure by displacing stop-rods J J and vibrating the levers H H. The draft-pole F passes between beams A A and B B, and is secured by bolts, and it may be lowered or raised at the front to suit the height of the team by placing washers upon the bolts in such a manner that they may be changed from top to bottom, or the reverse.

What I claim as new, and wish to secure by Letters Patent, is—

1. The combination of beams C C and $C^\times C^\times$ together with beams A A and B B, arranged substantially in the manner and for the purposes set forth.

2. I do not claim a separate drag-bar with drag-teeth inserted to form a combination of harrow and cultivator; but what I do claim is the construction and arrangement of plows or shovels E E, substantially as hereinbefore specified.

3. The combination of beams B B, bolts $b\ b$ and $c\ c$, together with plates G G, all arranged substantially in the manner and for the purposes set forth.

The above specification of my invention signed by me this 10th day of March, A. D. 1869.

GARLAND B. ST. JOHN.

Witnesses:
H. C. CLARK,
WM. S. CULORN.